(12) United States Patent
Li et al.

(10) Patent No.: US 12,321,635 B2
(45) Date of Patent: Jun. 3, 2025

(54) METHOD FOR ACCESSING SOLID STATE DISK AND STORAGE DEVICE

(71) Applicant: Huawei Technologies Co., Ltd., Guangdong (CN)

(72) Inventors: Li Li, Shenzhen (CN); Yi He, Chengdu (CN); Tao Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 17/707,021

(22) Filed: Mar. 29, 2022

(65) Prior Publication Data

US 2022/0222016 A1    Jul. 14, 2022

Related U.S. Application Data

(63) Continuation of application No. PCT/CN2020/114348, filed on Sep. 10, 2020.

(30) Foreign Application Priority Data

Sep. 30, 2019 (CN) .......................... 201910939824.8

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/067* (2013.01); *G06F 3/0679* (2013.01)

(58) Field of Classification Search
CPC .... G06F 3/0659; G06F 3/0604; G06F 3/0634; G06F 3/067; G06F 3/0679; G06F 3/0611;
(Continued)

(56) References Cited

U.S. PATENT DOCUMENTS 10,860,511 B1\* 12/2020 Thompson .............. G06F 13/28
2006/0256784 A1\* 11/2006 Feng ........................ G06F 13/28
370/381
(Continued)

FOREIGN PATENT DOCUMENTS

CN    101097519 A    1/2008
CN    102308274 A    1/2012
(Continued)

*Primary Examiner* — Francisco A Grullon
(74) *Attorney, Agent, or Firm* — WOMBLE BOND DICKINSON (US) LLP (57) ABSTRACT

A method for accessing a solid state disk and a storage device are provided. The storage device includes a network interface card, a memory, and a solid state disk, the network interface card receives to-be-written data and a write command, where the write command instructs to write the to-be-written data to the solid state disk; the network interface card writes the to-be-written data to the memory, and writes the write command to a submission queue of the solid state disk. Then, the network interface card notifies the solid state disk that there is a to-be-executed command in the submission queue of the solid state disk, where the to-be-executed command is the write command. The solid state disk obtains the to-be-written data from the memory and writes the to-be-written data to a medium of the solid state disk according to the write command.

20 Claims, 5 Drawing Sheets

(58) Field of Classification Search
CPC ........ G06F 3/0656; G06F 9/547; G06F 9/544; G06F 9/546
See application file for complete search history.

(56) References Cited

U.S. PATENT DOCUMENTS

| | | | |
|---|---|---|---|
| 2013/0198311 A1* | 8/2013 | Tamir | H04L 69/12 |
| | | | 709/212 |
| 2015/0134857 A1 | 5/2015 | Hahn et al. | |
| 2015/0261434 A1* | 9/2015 | Kagan | G06F 13/28 |
| | | | 711/103 |
| 2015/0261720 A1* | 9/2015 | Kagan | G06F 13/287 |
| | | | 709/212 |
| 2016/0117277 A1* | 4/2016 | Raindel | G06F 9/546 |
| | | | 710/112 |
| 2016/0127493 A1* | 5/2016 | Shalom | G06F 13/28 |
| | | | 709/213 |
| 2016/0139981 A1 | 5/2016 | Chennamsetty et al. | |
| 2017/0177541 A1* | 6/2017 | Berman | G06F 3/0656 |
| 2017/0286363 A1* | 10/2017 | Joshua | G06F 3/0688 |
| 2018/0018101 A1 | 1/2018 | Benisty et al. | |
| 2018/0275921 A1 | 9/2018 | Katagiri et al. | |
| 2019/0079895 A1 | 3/2019 | Kim et al. | |
| 2019/0155760 A1* | 5/2019 | Chang | G06F 3/0659 |
| 2019/0310964 A1* | 10/2019 | Zhang | G06F 15/17331 |
| 2020/0050551 A1* | 2/2020 | He | G06F 3/0659 |
| 2020/0326891 A1* | 10/2020 | Luo | G06F 3/0688 |
| 2022/0179809 A1* | 6/2022 | Venkataramani | G06F 3/0664 |
| 2023/0401079 A1* | 12/2023 | Radi | G06F 9/544 |

FOREIGN PATENT DOCUMENTS

| | | |
|---|---|---|
| CN | 104267912 A | 1/2015 |
| CN | 106527974 A | 3/2017 |
| CN | 107077426 A | 8/2017 |
| CN | 107992436 A | 5/2018 |
| CN | 108369530 A | 8/2018 |
| CN | 110086571 A | 8/2019 |

* cited by examiner

METHOD FOR ACCESSING SOLID STATE DISK AND STORAGE DEVICE

CROSS-REFERENCE TO RELATED APPLICATIONS

This is a continuation of International Patent Application No. PCT/CN2020/114348 filed on Sep. 10, 2020, which claims priority to Chinese Patent Application No. 201910939824.8 filed on Sep. 30, 2019. The disclosures of the aforementioned applications are hereby incorporated by reference in their entireties.

TECHNICAL FIELD

Embodiments of this disclosure relate to the computer field, and in particular, to a method for accessing a solid state disk and a storage device.

BACKGROUND

Current storage systems may use forms such as distributed storage, network-attached storage (NAS), and a storage area network (SAN). In these storage systems, clients and storage devices are connected through networks. Solid state disks (SSDs) are used in the foregoing storage systems because of advantages of high bandwidth, a low latency, and a high throughput. For the storage system, how the client efficiently accesses data in the solid state disk through the network is an important issue.

In the conventional technology, when the client needs to access a solid state disk of the storage device, a central processing unit (CPU) of the client constructs a read command or a write command, a network interface card of the client sends the read command or the write command to a network interface card of the storage device, and then the network interface card of the storage device notifies a CPU of the storage device. Then, access to the solid state disk is completed under control of the CPU of the storage device.

However, the method in the conventional technology may result in a long data access latency and excessively high CPU usage of the storage device.

SUMMARY

Embodiments of this disclosure provide a method for accessing a solid state disk and a storage device, to resolve problems of a long data access latency and excessively high CPU usage in the conventional technology.

According to a first aspect, an embodiment of this disclosure provides a method for accessing a solid state disk. The method is applied to a storage device, and the storage device includes a network interface card, a memory, and a solid state disk. In this method, the network interface card receives to-be-written data and a write command, where the write command instructs to write the to-be-written data to the solid state disk. After receiving the to-be-written data and the write command, the network interface card writes the to-be-written data to the memory, and writes the write command to a submission queue of the solid state disk. Then, the network interface card notifies the solid state disk that there is a to-be-executed command in the submission queue of the solid state disk, where the to-be-executed command is the write command. The solid state disk obtains the to-be-written data from the memory and writes the to-be-written data to a medium of the solid state disk according to the write command.

In the foregoing method, after receiving the write command, the network interface card of the storage device may directly interact with the solid state disk to complete data writing, without participation of a CPU. Therefore, a data access latency can be greatly reduced. In addition, because the CPU does not need to participate, CPU usage of the storage device can also be greatly reduced.

In a possible implementation, the submission queue of the solid state disk is located in the memory.

In another possible implementation, the submission queue of the solid state disk is located in the solid state disk.

In a possible implementation, the network interface card may receive the to-be-written data and the write command in the following manner:

receiving an access request, where the access request includes the to-be-written data and the write command.

Based on this possible implementation, when writing the write command to the submission queue of the solid state disk, the network interface card may parse the access request to obtain the write command, and write the write command to the submission queue of the solid state disk.

In the foregoing possible implementation, one access request carries both the to-be-written data and the write command, to reduce a quantity of interaction commands, and save transmission resources.

In a possible implementation, the network interface card may further receive the to-be-written data and the write command in the following manner:

receiving a first command, where the first command indicates the to-be-written data; and receiving a second command, where the second command includes the write command.

In the foregoing possible implementation, the first command and the second command respectively carry the to-be-written data and the write command. In this manner, command parsing complexity can be reduced.

In a possible implementation, the solid state disk may write the to-be-written data to the medium of the solid state disk through the following process:

parsing the write command to obtain a storage address of the to-be-written data in the memory; and obtaining the to-be-written data from the storage address in the memory, and writing the to-be-written data to the medium of the solid state disk.

In the foregoing possible implementation, the write command carries the address at which the to-be-written data is temporarily stored in the memory of the storage device. The solid state disk may write the to-be-written data temporarily stored in the memory to the medium of the solid state disk based on the address, to correctly write the data to the medium of the solid state disk.

In a possible implementation, the network interface card may notify, in the following manner, the solid state disk that there is the to-be-executed command in the submission queue:

sending notification information to a submission queue doorbell of the solid state disk, where the notification information notifies the solid state disk that there is the to-be-executed command in the submission queue.

The notification information is sent to the submission queue doorbell of the solid state disk, so that the solid state disk can learn that there is the to-be-executed command in the submission queue, and then execute the command, to ensure that the solid state disk can execute the to-be-executed command in a timely manner.

When the network interface card sends the notification information to the submission queue doorbell of the solid state disk, when the network interface card receives the to-be-written data by using the first command, and receives the write command by using the second command, the network interface card may receive a third command, and send the notification information to the submission queue doorbell of the solid state disk according to the third command, where the third command includes the notification information.

In this possible implementation, the network interface card may learn, based on the third command, of the notification information that is to be sent to the solid state disk, to ensure that the solid state disk receives the notification information, and performs data writing based on the notification information.

In a possible implementation, after completing data writing, the solid state disk further writes an RDMA_SEND command to an SQ of the network interface card, where the RDMA_SEND command carries response information about executing the write command by the solid state disk.

In a possible implementation, the solid state disk further sends a notification to an SQ doorbell of the network interface card, to notify the network interface card that there is a to-be-executed command in the SQ of the network interface card.

According to a second aspect, an embodiment of this disclosure provides a storage device. The storage device includes a network interface card, a memory, and a solid state disk.

The network interface card is configured to receive to-be-written data and a write command, where the write command instructs to write the to-be-written data to the solid state disk. The network interface card is further configured to write the to-be-written data to the memory. The network interface card is further configured to write the write command to a submission queue of the solid state disk. The network interface card is further configured to notify the solid state disk that there is a to-be-executed command in the submission queue, where the to-be-executed command is the write command.

The solid state disk is configured to obtain the to-be-written data from the memory and write the to-be-written data to a medium of the solid state disk according to the write command.

In a possible implementation, the submission queue of the solid state disk is located in the memory.

In a possible implementation, the submission queue of the solid state disk is located in the solid state disk.

In a possible implementation, the network interface card is further configured to:
  receive an access request, where the access request includes the to-be-written data and the write command.

In a possible implementation, the network interface card is further configured to:
  parse the access request to obtain the write command, and write the write command to the submission queue of the solid state disk.

In a possible implementation, the network interface card is further configured to:
  receive a first command, where the first command indicates the to-be-written data; and
  receive a second command, where the second command includes the write command.

In a possible implementation, the solid state disk is further configured to:
  parse the write command to obtain a storage address of the to-be-written data in the memory; and
  obtain the to-be-written data from the storage address in the memory, and write the to-be-written data to the medium of the solid state disk.

In a possible implementation, the network interface card is further configured to:
  send notification information to a submission queue doorbell of the solid state disk, where the notification information notifies the solid state disk that there is the to-be-executed command in the submission queue.

In a possible implementation, the network interface card is further configured to:
  send the notification information to the submission queue doorbell of the solid state disk according to a received third command, where the third command includes the notification information.

According to the method for accessing the solid state disk and the storage device provided in the embodiments of this disclosure, after receiving the write command, the network interface card of the storage device may directly interact with the solid state disk to complete data writing, without the participation of the CPU. Therefore, the data access latency can be greatly reduced. In addition, because the CPU does not need to participate, CPU usage of the storage device can also be greatly reduced.

DESCRIPTION OF EMBODIMENTS

Figure 1:
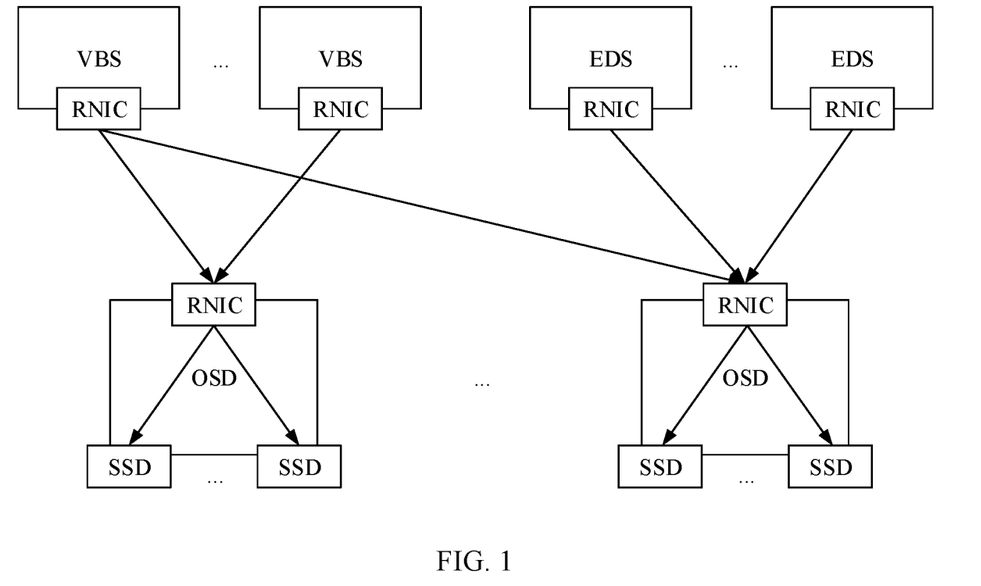
FIG. 1 is a diagram of an example application scenario of a method for accessing a solid state disk according to an embodiment of this disclosure.

FIG. 1 is a diagram of an example application scenario of a method for accessing a solid state disk according to an embodiment of this disclosure. As shown in FIG. 1, the method may be applied to a distributed storage scenario. In the distributed storage scenario, a storage system may include a plurality of clients and a plurality of storage devices. Any client can access any storage device. The client may be a host on a user side, or may be a control device on a storage side. When the client is a host, a virtual block service (VBS) and some applications may be installed on the client. When the client is a control device, an enterprise distribution system (EDS) and management software for a storage service may be installed on the client. The storage device may be a storage server in a physical form. In FIG. 1, an object storage device (OSD) is used as an example, but the storage device is not limited to the object storage device. The client has a network interface card, and a network interface card and a hard disk (in this embodiment, a solid state disk is used as an example for description) are deployed in the storage device. When the client is to access data stored in the OSD, the client may initiate a corresponding data access command to the OSD according to the method provided in this embodiment of this disclosure, to instruct a network interface card in the OSD to complete access to the hard disk.

Figure 2:
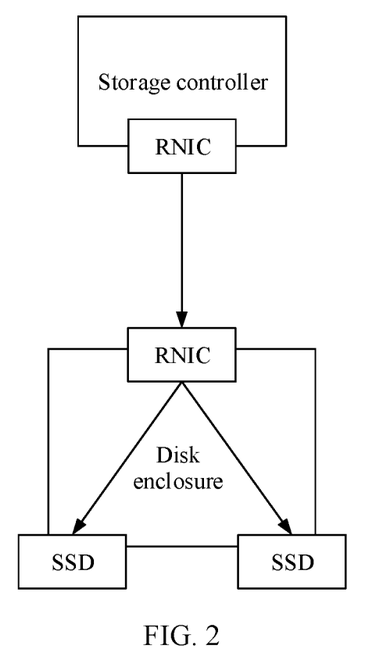
FIG. 2 is a diagram of another example application scenario of a method for accessing a solid state disk according to an embodiment of this disclosure.

FIG. 2 is a diagram of another example application scenario of the method for accessing the solid state disk according to an embodiment of this disclosure. As shown in FIG. 2, the method may be applied to an enterprise storage scenario. In the enterprise storage scenario, a storage system includes a client and a storage device. In the scenario shown in FIG. 2, the client is generally a control device, and the storage device is a disk enclosure. Different from a conventional disk enclosure, the disk enclosure in this embodiment not only includes a network interface card and a hard disk, but also includes a processor and a memory (which are described in detail in FIG. 3).

The method in embodiments of this disclosure may be applied to storage systems that support a remote direct access protocol. Specifically, a network protocol on which these storage systems are based is a protocol that supports remote direct access. In an example, the protocol that supports the remote direct access may be a remote direct memory access (RDMA) protocol. Correspondingly, a network protocol that supports the RDMA protocol may be an RDMA over converged Ethernet (RoCE) protocol, an Internet wide area RDMA protocol (iWARP), an InfiniBand protocol, or the like.

For ease of understanding, in the following embodiments of this disclosure, the RoCE protocol is used as an example, and a message, a command, and the like in the RoCE protocol are used to describe the technical solutions in embodiments of this disclosure. It should be understood that this cannot be construed as a limitation on embodiments of this disclosure. The technical solutions in embodiments of this disclosure may further be applied to a storage system based on another RDMA network protocol.

In a possible data access manner, for example, the client requests to read data, the client notifies a CPU of a storage controller of a read command, and the CPU of the storage controller notifies a solid state disk to read the data. After the solid state disk reads the data, the CPU of the storage controller may be interrupted, to indicate a network interface card to send the read data and a response to the client. First, in this processing manner, the CPU of the storage controller, the network interface card, and the solid state disk need to interact to complete data access, accordingly resulting in a relatively long data access latency. In addition, the CPU of the storage controller participates in a data access process, resulting in excessively high CPU usage.

The technical solutions in embodiments of this disclosure are intended to resolve the foregoing problems.

Figure 3:
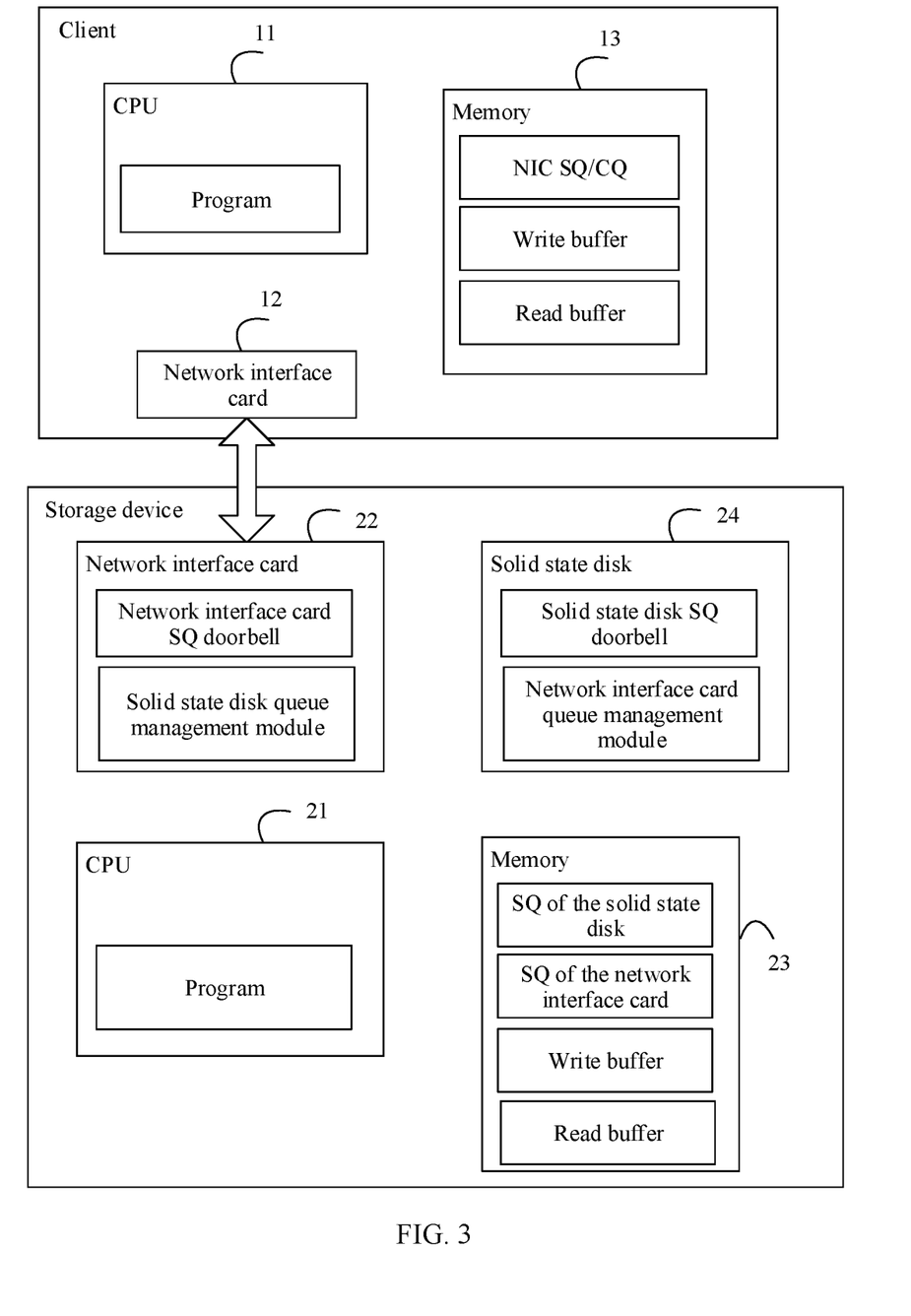
FIG. 3 is a diagram of an example system architecture according to an embodiment of this disclosure.

FIG. 3 is a diagram of an example system architecture of the solid state disk access method according to an embodiment of this disclosure. As shown in FIG. 3, a client and a storage device are included in this method. The client includes a CPU 11, a network interface card 12, and a memory 13. The storage device includes a CPU 21, a network interface card 22, a memory 23, and a solid state disk 24.

The CPU 21 is configured to process an I/O request from outside the storage device or a request generated in the storage device. The memory 23 is configured to temporarily store data received from the client or data read from a hard disk. When receiving a plurality of write commands sent by the client, the network interface card 22 may temporarily store data in the plurality of write commands in the memory 23, and notify the solid state disk 24 to write the temporarily stored data to a medium of the solid state disk 24. The memory 23 includes a volatile memory, a non-volatile memory, or a combination thereof. The volatile memory is, for example, a random access-memory (RAM). The non-volatile memory includes, for example, various machine-readable media that can store program code, such as a flash chip, a floppy disk, a hard disk, an SSD, or an optical disc. The memory 23 may have a power-off protection function. The power-off protection function means that data stored in the memory 23 is not lost when a system is powered off and then powered on again.

The solid state disk 24 includes a primary controller and a storage medium. The primary controller is configured to receive an I/O request or other information sent by the network interface card 22 to the solid state disk 24, for example, a logical address of a data block, and the primary controller is further configured to execute the received I/O request, for example, write a data block carried in the I/O request to the storage medium, or read a data block from the storage medium. The storage medium generally includes several flash chips. Each flash chip includes several blocks. Each block includes several pages, and the primary controller writes the data block to the block by page each time.

The network interface card 22 includes a processor and a memory. The processor is configured to receive an I/O request or other information sent by the network interface card 12 of the client, and the processor is further configured to execute the received I/O request, for example, write a data block carried in the I/O request to a storage address in the memory, or send data in a storage address in the memory to the network interface card 12 of the client. The memory of the network interface card 22 may be, for example, a RAM or a read-only memory (ROM).

It should be noted that the foregoing uses the CPU 21, the memory 23, the network interface card 22, and the solid state disk 24 on the storage device side as examples to describe these components. Functions of the CPU 11, the memory 13, and the network interface card 12 on the client side correspond to functions of the components on the storage device side. Details are not described herein again.

The system architecture shown in FIG. 3 may be applied to the scenarios shown in FIG. 1 and FIG. 2. The CPU 11 of the client sends a data access command to the network interface card 12. In this embodiment of this disclosure, the data access command is a write command or a read command. The write command instructs to write data to the solid state disk, and the read command instructs to read data from the solid state disk. The network interface card 12 then sends the data access command to the network interface card 22 of the storage device, and the network interface card 22 exchanges information with the solid state disk 24, to complete access to the solid state disk.

The following describes specific functions of the foregoing components in the client and the storage device shown in FIG. 3 and an information exchange process between the components.

On the client side, the CPU 11 is configured to run a computer program. When the computer program is run, the CPU 11 can process a data access request, construct a data access command, and send the data access command to the storage device by using the network interface card 12. The data access command may be a write command or a read command. A storage area is pre-allocated in the memory 13, and is used to store a completion queue (CQ) and a submission queue (SQ) of the network interface card 12. A command to be executed by the network interface card is placed in the SQ of the network interface card 12. After completing executing one or more commands in the SQ, the network interface card 12 writes command execution completion information to the CQ. The command in the SQ may be written by the CPU 11. After the network interface card 12 completes executing the one or more commands in the SQ, the network interface card 12 writes the command execution completion information to the CQ, and then the CPU 11 indicates, based on the information in the CQ, the network interface card 12 to execute a new command. A write buffer and a read buffer are further separately allocated in the memory 13. When the client is to write data to the storage device, after receiving a data write request, the client first temporarily stores the to-be-written data to the write buffer of the memory 13, and then sends the to-be-written data in the write buffer to the storage device when sending a write command to the storage device. After the client sends a read command to the storage device, the storage device sends data requested by the read command to the read buffer of the client, and then the CPU 11 reads the data from the read buffer.

The network interface card 12 of the client is communicatively connected to the network interface card 22 of the storage device. The CPU 11 sends the data access command to the storage device by using the network interface card 12, and the network interface card 12 receives data and a response that are returned by the storage device. After receiving the data and the response that are returned by the storage device, the network interface card 12 notifies the CPU 11 to perform processing. For a storage system based on a different network protocol, the network interface card 12 may communicate with the network interface card 22 of the storage device based on the different network protocol. For example, the network interface card 12 may communicate with the network interface card 22 based on the foregoing protocol, for example, RoCE, iWARP, or InfiniBand, or the TCP/IP protocol. Correspondingly, the network interface card 12 and the network interface card 22 are network interface cards that support the network protocol. For example, the network interface card 12 and the network interface card 22 support the RoCE protocol. In this case, both the network interface card 12 and the network interface card 22 are network interface cards having an RDMA function (RDMA enabled NICs, RNICs). In addition, the CPU 11, the memory 13, and the network interface card 12 are connected through a peripheral component interconnect express (PCIe) bus. Therefore, the network interface card 12 has a PCIe interface, to be connected to the CPU 11 and the memory 13 through the PCIe interface and bus.

On the storage device side, the CPU 21 is configured to run a computer program. In this embodiment of this disclosure, the computer program run in the CPU 21 is used for initialization that includes initializing an SQ of the network interface card 22 and an SQ of the solid state disk 24, and binding the SQ of the network interface card 22 and the SQ of the solid state disk 24. A specific process is described in detail in the following initialization process.

A storage area is pre-allocated in the memory 23, and is used to store the SQ of the network interface card 22. In a conventional processing manner, the CPU 21 writes a command to be executed by the network interface card 22 to the SQ of the network interface card 22. After the network interface card 22 completes executing the command in the SQ, the network interface card 22 writes execution completion information to a CQ, and notifies the CPU 21 to perform processing. However, in this embodiment of this disclosure, a data access related command that is to be executed by the network interface card 22 may not be processed by the CPU 21, but is written by the solid state disk 24 to the SQ of the network interface card 22. After completing executing the command in the SQ, the network interface card 22 no longer needs to write the completion information to the CQ. Refer to FIG. 3. Processing such as writing a command to the SQ of the network interface card 22 by the solid state disk 24 may be implemented by a network interface card queue management module disposed in the solid state disk 24. The network interface card queue management module may be a hardware module or a software module. A specific form of the network interface card queue management module is not limited in this embodiment of this disclosure.

A storage area is further pre-allocated in the memory 23, and is used to store the SQ of the solid state disk 24. In a conventional processing manner, the CPU 21 writes a command to be executed by the solid state disk 24 to the SQ of the solid state disk 24. After the solid state disk 24 completes executing the command in the SQ, the solid state disk 24 writes execution completion information to a CQ, and notifies the CPU 21 to perform processing. However, in this embodiment of this disclosure, a data access related command that is to be executed by the solid state disk 24 may not be processed by the CPU 21, but is written by the network interface card 22 to the SQ of the solid state disk 24. After completing executing the command in the SQ, the solid state disk 24 no longer needs to write the completion information to the CQ. Refer to FIG. 3. Processing such as writing a command to the SQ of the solid state disk 24 by the network interface card 22 may be implemented by a solid state disk queue management module disposed in the network interface card 22. The solid state disk queue management module may be a hardware module or a software module. A specific form of the solid state disk queue management module is not limited in this embodiment of this disclosure.

It should be noted that, in addition to that both the SQ of the network interface card 22 and the SQ of the solid state disk 24 shown in FIG. 3 are located in the memory 23, in another optional implementation, the SQ of the network interface card 22 may alternatively be located in the network interface card 22, and the SQ of the solid state disk 24 may alternatively be located in the solid state disk 24. In some embodiments, when the SQ of the network interface card 22 is located in the network interface card 22, the SQ may be located in the RAM of the network interface card 22. In some embodiments, when the SQ of the solid state disk 24 is located in the solid state disk 24, the SQ may be located in the storage medium of the solid state disk 24.

A write buffer and a read buffer are further separately allocated in the memory 23. After receiving the to-be-written data sent by the client, the network interface card 22 first temporarily stores the to-be-written data in the write buffer of the memory 23, and then the solid state disk 24 writes the to-be-written data from the write buffer to the medium of the solid state disk 24. When the client requests the storage device to read data in the solid state disk 24, the solid state disk 24 first temporarily stores the read data in the read buffer, and then the network interface card 22 sends the data from the read buffer to the client.

The solid state disk 24 can identify a data access related command that is in the SQ and that is written by the network interface card 22, and after completing executing the command, return an execution result to the client by using the network interface card 22. In addition, the solid state disk 24 is bound to the SQ of the network interface card 22 in advance. When performing data access processing, the solid state disk 24 may write a data access related command to the SQ of the network interface card 22. In some embodiments, as described above, the network interface card queue management module in the solid state disk 24 may implement the command writing process. The solid state disk 24 includes a solid state disk SQ doorbell, and the solid state disk SQ doorbell may be a register in the solid state disk 24. When writing the command to the SQ of the solid state disk 24, the network interface card 22 may send a notification to the solid state disk SQ doorbell, so that the solid state disk 24 learns that the command is written to the SQ.

The network interface card 22 can identify and execute the data access related command that is in the SQ of the network interface card 22 and that is written by the solid state disk 24. In addition, the network interface card 22 is bound to the SQ of the solid state disk 24 in advance. When performing data access processing, the network interface card 22 may write the data access related command to the SQ of the solid state disk 24. In some embodiments, as described above, the solid state disk queue management module in the network interface card 22 may implement the command writing process. The network interface card 22 includes a network interface card SQ doorbell, and the network interface card SQ doorbell may be a register in network interface card 22. When writing the command to the SQ of the network interface card 22, the solid state disk 24 may send a notification to the network interface card SQ doorbell, so that the network interface card 22 learns that the command is written to the SQ.

The CPU 21, the memory 23, the network interface card 22, and the solid state disk 24 are connected through a PCIe bus. Therefore, the network interface card 22 has a PCIe interface, to be connected to the CPU 21, the memory 23, and the solid state disk 24 through the PCIe interface and bus. In addition, the solid state disk 24 has a PCIe interface, to be connected to the CPU 21, the memory 23, and the network interface card 22 through the PCIe interface and bus.

The following separately describes a system initialization process, a data writing process, and a data reading process based on the system architecture shown in FIG. 3.

Figure 4:
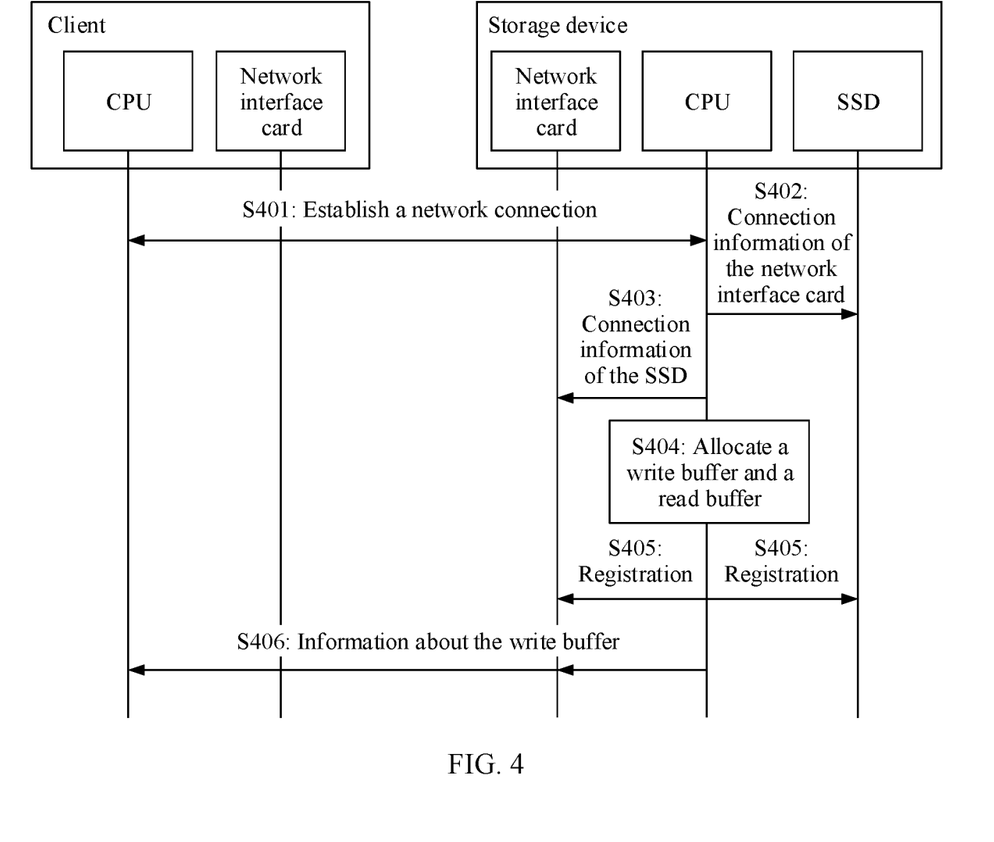
FIG. 4 is a diagram of a system initialization process of a method for accessing a solid state disk according to an embodiment of this disclosure.

FIG. 4 is a diagram of a system initialization process of the solid state disk access method according to an embodiment of this disclosure. The initialization process may be performed before the client accesses data in the storage device. As shown in FIG. 4, the system initialization process includes the following operations.

S401: The CPU 11 and the CPU 21 establish a network connection by using network interface cards.

In some embodiments, the CPU 11 and the CPU 21 may establish the network connection based on a network protocol. The network protocol may be, for example, the foregoing protocol, for example, RoCE, iWARP, InfiniBand, or TCP/IP.

S402: The CPU 21 creates a queue of the network interface card 22, establishes an RDMA connection, and sends queue information of the network interface card 22 to the solid state disk 24.

The CPU 21 may create the queue of the network interface card 22, including creating the SQ and the network interface card SQ doorbell of the network interface card 22. The created SQ of the network interface card 22 has a base address, and the created network interface card SQ doorbell has a doorbell address. In addition, the CPU 21 allocates a connection identifier to the RDMA connection of the network interface card 22. In this way, the connection identifier is in a one-to-one correspondence with the SQ, the SQ base address, and the SQ doorbell of the network interface card 22. One storage device may include one solid state disk 24, or may include a plurality of solid state disks 24. One solid state disk 24 may have a plurality of SQs. One RDMA connection corresponds to one SQ of one solid state disk 24. One RDMA connection corresponds to one SQ and one SQ doorbell of the network interface card 22, and is used by a solid state disk corresponding to the connection. An SQ of the solid state disk 24 corresponding to the RDMA connection is used only for command access of the corresponding RDMA connection.

For example, it is assumed that an RDMA connection 1 corresponds to an SQ 1 of a solid state disk A of the storage device, and the RDMA connection 1 includes a connection identifier 1 and an SQ 1 and a doorbell 1 of a network interface card. In this case, when the solid state disk A is to transmit data through the RDMA connection 1, the solid state disk A may write a command to the SQ 1 of the network interface card. After writing the command to the SQ 1 of the network interface card, the solid state disk A sends a notification to the doorbell 1 of the network interface card, so that the network interface card learns that there is a to-be-executed command in the SQ 1. When the connection to which the SQ 1 of the current network interface card belongs receives a solid state disk access command from the client, a command may be written to the SQ 1 of the solid state disk A.

After creating the connection of the network interface card 22, the CPU 21 sends the queue information of the network interface card 22, including the connection identifier and the base address of the SQ and the address of the network interface card SQ doorbell of the network interface card 22, to the solid state disk 24, so that the solid state disk 24 uses the queue information during data access.

S403: The CPU 21 creates a queue of the solid state disk 24, and sends queue information of the solid state disk 24 to the network interface card 22.

The CPU 21 creates the queue of the solid state disk 24, including creating the SQ and the solid state disk SQ doorbell of the solid state disk 24. The created SQ of the solid state disk 24 has a base address, and the created solid state disk SQ doorbell has a doorbell address.

After creating the queue of the solid state disk 24, the CPU 21 sends the queue information of the solid state disk 24, including the base address of the SQ and the address of the solid state disk SQ doorbell of the solid state disk 24, to the network interface card 22, so that the network interface card 22 uses the queue information during data access.

After operations S402 and S403, the network interface card 22 sends, to the solid state disk 24, the SQ base address and the doorbell address that are to be used by the solid state disk 24, and the solid state disk 24 sends, to the network interface card 22, the base address of the SQ and the address of the SQ doorbell that are to be used by the network interface card 22, to complete binding the SQ of the network interface card 22 and the SQ of the solid state disk 24.

S404: The CPU 21 allocates the write buffer and the read buffer.

The CPU 21 applies for two memory regions in the memory 23, where one is used as the write buffer, and the other is used as the read buffer.

S405: The CPU 21 registers information about the write buffer and information about the read buffer with the network interface card 22 and the solid state disk 24.

In a manner, the CPU 21 may send a start address and an end address of the write buffer and a start address and an end address of the read buffer to the network interface card 22 and the solid state disk 24. The network interface card 22 and the solid state disk 24 may perform a read and write operation on the read buffer and the write buffer based on the addresses of the read buffer and the write buffer.

In another manner, the CPU 21 may send a start address and a length of the write buffer and a start address and a length of the read buffer to the network interface card 22 and the solid state disk 24. The network interface card 22 and the solid state disk 24 may perform a read and write operation on the read buffer and the write buffer based on the start addresses and the lengths of the read buffer and the write buffer.

After receiving the information about the write buffer, the network interface card 22 correspondingly generates a memory region key (MR-key) of the network interface card 22. The MR-key has a unique correspondence with the write buffer, and the write buffer may be indicated by using the MR-key.

After receiving the information about the write buffer, the solid state disk 24 correspondingly generates an MR-key of the solid state disk. The MR-key has a unique correspondence with the write buffer, and the write buffer may be indicated by the MR-key.

S406: The CPU 21 sends registration information of the write buffer to the CPU 11 of the client by using the network interface card 22.

The registration information of the write buffer includes the MR-key of the network interface card 22, the MR-key of the solid state disk 24, and the length of the write buffer.

The registration information of the write buffer may be sent by the network interface card 22 to the network interface card 12 of the client, and then notified by the network interface card 12 to the CPU 11 of the client. When the CPU 11 is to write data to the solid state disk 24, the CPU 11 may add the information about the write buffer in a data access command. A specific use process is described in detail in the following data writing process.

In an optional manner, the CPU 11 may manage the read buffer. In this case, the CPU 21 further sends registration information of the read buffer to the CPU 11 by using the network interface card 22.

When the CPU 11 manages the read buffer, and the CPU 11 is to read data from the solid state disk 24, the CPU 11 may add the information about the read buffer in a data access command. A specific use process is described in detail in the following data reading process.

It should be noted that, in an example implementation process, operations S402 and S403 may be performed in no particular order. S402 may be performed before S403, or S403 may be performed before S402. In addition, operations S404 to S406 and operations S402 and S403 may also be performed in no particular order. S402 and S403 may be performed before S404 to S406, or S404 to S406 may be performed before S402 and S403.

Figure 5:
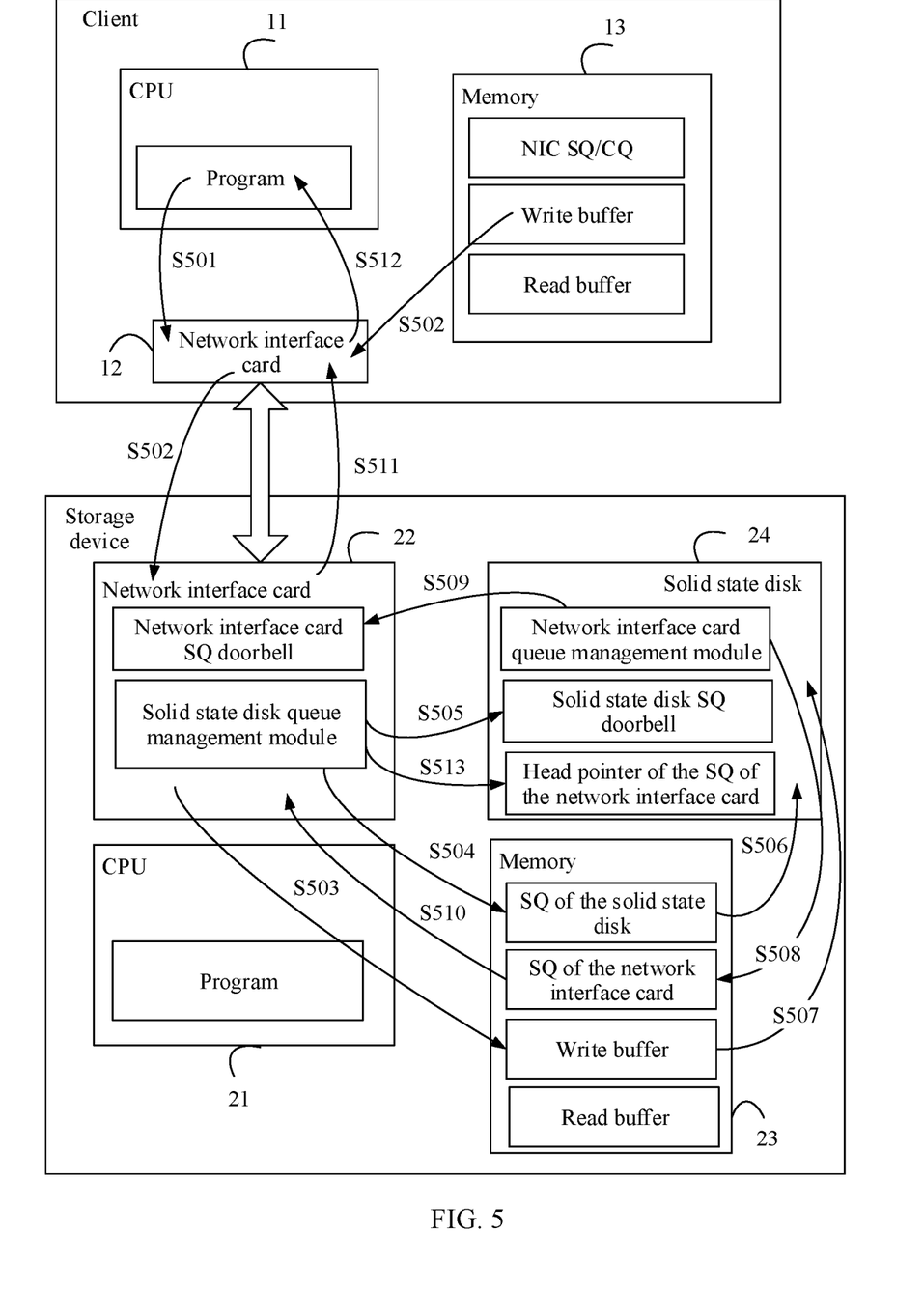
FIG. 5 is a schematic diagram of a data writing process of a method for accessing a solid state disk according to an embodiment of this disclosure.

FIG. 5 is a schematic diagram of a data writing process of the method for accessing the solid state disk according to an embodiment of this disclosure. As shown in FIG. 5, a process in which the client writes data to the solid state disk of the storage device includes the following operations.

S501: The CPU 11 constructs a write command, and sends the write command and information about the to-be-written data to the network interface card 12.

The to-be-written data may be stored in the write buffer of the memory 13 of the client. After determining that the to-be-written data is written to the write buffer, the CPU 11 may send two pieces of information to the storage device: the to-be-written data and the write command. The to-be-written data is data that may be written to the medium of the solid state disk 24 of the storage device. The write command is a command that may be executed by the solid state disk 24. The write command includes a data source address, and the data source address may be indicated by the MR-key and an offset of the solid state disk 24. As described above, during system initialization, the CPU 21 sends the registration information of the write buffer to the CPU 11 by using the network interface card 22. In this operation, when the CPU 11 is to write the data to the solid state disk 24, the CPU 11 adds an MR-key and an offset of a solid state disk that correspond to the write buffer to the constructed write command. The MR-key may indicate the write buffer, and the offset may indicate an offset address of the to-be-written data when the to-be-written data is stored in the write buffer. The solid state disk 24 may learn a storage address of the to-be-written data based on the two pieces of information, and write the to-be-written data from the data source address to the medium of the solid state disk 24.

The CPU 11 may send the to-be-written data and the write command in any one of the following manners.

In a first manner, the CPU 11 constructs an access request. The access request includes information indicating the storage address of the to-be-written data in the memory 13 of the client, and the access request further includes the write command and the to-be-written data.

In some embodiments, the access request may be an RDMA_WRITE_EXT command. The RDMA_WRITE_EXT command includes the to-be-written data, the write command, and the information indicating a storage address of the to-be-written data in the memory 13 of the client. In the following embodiments, an example in which the access request is an RDMA_WRITE_EXT command is used for description.

In this manner, the CPU 21 sends the RDMA_WRITE_EXT command to the network interface card 12 of the client, and the network interface card 12 executes the command, to send the to-be-written data and the write command to the storage device.

In an example, it is assumed that the client communicates with the storage device based on the RoCE protocol. In this case, an RDMA_WRITE command may be extended to construct the RDMA_WRITE_EXT command. Specifically, immediate data in the RDMA_WRITE command is extended to a size suitable for accommodating the command, for example, extended to 64 bytes, and the write command is carried in the immediate data. In addition, an original part that is of the RDMA_WRITE command and that indicates the storage address of the to-be-written data may remain unchanged, and the information about the storage address of the to-be-written data may be carried in this part.

In a second manner, the CPU 11 may send the to-be-written data, the write command, and a solid state disk SQ doorbell notification by using three commands. The three commands are a first command, a second command, and a third command. In an example, all the three commands may be RDMA_WRITE commands, and may be a first RDMA_WRITE command, a second RDMA_WRITE command, and a third RDMA_WRITE command. The following uses the RDMA_WRITE command as an example for description.

In this manner, the CPU 11 sends the first RDMA_WRITE command, where the command includes the to-be-written data; sends the second RDMA_WRITE command, where the command includes the write command; and sends the third RDMA_WRITE command, where the command includes the solid state disk SQ doorbell notification. In this manner, in operation S405, the CPU 21 may register, with the network interface card 22, the base address of the SQ and the address of the SQ doorbell of the solid state disk that are obtained in operation S403, and in operation S406, the CPU 21 may send registration information of the base address of the SQ and the address of the SQ doorbell of the solid state disk to the CPU 11 by using the network interface card 22. Correspondingly, when sending the second command, the CPU 11 calculates a destination address of the write command this time in the SQ of the solid state disk 24 with reference to the base address of the SQ of the solid state disk and a quantity of commands sent to the solid state disk, and adds the destination address to the second command. When sending the third command, the CPU 11 uses the address of the SQ doorbell as the destination address.

S502: The network interface card 12 sends the to-be-written data and the write command to the network interface card 22.

When the CPU 11 constructs the command in the first optional manner, the network interface card 12 sends the RDMA_WRITE_EXT command to the network interface card 22. Correspondingly, the network interface card 22 receives the RDMA_WRITE_EXT command.

The network interface card 12 sending the RDMA_WRITE_EXT command to the network interface card 22 means that the network interface card 12 sends the to-be-written data in the storage address in the memory 13 of the client and the write command to the network interface card 22 in a format of the RDMA_WRITE_EXT command.

When the CPU 11 constructs the command in the second optional manner, the network interface card 12 separately sends the first RDMA_WRITE command, the second RDMA_WRITE command, and the third RDMA_WRITE command to the network interface card 22. Correspondingly, the network interface card 22 receives the first RDMA_WRITE command, the second RDMA_WRITE command, and the third RDMA_WRITE command.

S503: The network interface card 22 writes the to-be-written data to the memory 23.

When the CPU 11 constructs the command in the first optional manner, the network interface card 22 obtains the to-be-written data from the RDMA_WRITE_EXT command and writes the to-be-written data to a segment of space that is of the write buffer and that is specified in the RDMA_WRITE_EXT command.

When the CPU 11 constructs the command in the second optional manner, the network interface card 22 obtains the to-be-written data from the first RDMA_WRITE command and writes the to-be-written data to a segment of space that is of the write buffer and that is specified in the first RDMA_WRITE command.

In some embodiments, the network interface card 22 may write the to-be-written data to a storage address in the memory 23. The storage address may be the address that is in the write buffer and that is selected by the CPU 11 when the CPU 11 constructs the write command in operation S501.

In operation S405 in the foregoing initialization process of a storage system, when the CPU 21 registers the information about the write buffer and the information about the read buffer with the network interface card 22, the network interface card 22 correspondingly generates the MR-key of the network interface card. There is the unique correspondence between the MR-key and the write buffer registered with the network interface card 22. In operation S406, the CPU 21 sends the registration information of the write buffer, including the MR-key of the network interface card and the length of the write buffer, to the CPU 21 by using the network interface card 22. When sending the to-be-written data to the storage device, the CPU 21 sends the MR-key of the network interface card 22 and the offset address of the to-be-written data in the write buffer together with the to-be-written data. Then, in this operation, when receiving the to-be-written data, the network interface card 22 may determine, based on the MR-key and the offset address that are sent together with the to-be-written data, an address in the write buffer to which the to-be-written data should be written. Then, starting from the address, the network interface card 22 writes the to-be-written data to the write buffer.

In an optional manner, the network interface card 22 may write the to-be-written data to the storage address in the memory in a direct memory access (DMA) manner. In this manner, the to-be-written data may be written to the storage address in the memory by using a DMA controller without participation of a CPU.

S504: The network interface card 22 writes the write command to the SQ of the solid state disk 24.

When the CPU 11 constructs the command in the first optional manner, the network interface card 22 parses the RDMA_WRITE_EXT command to obtain the write command.

As described above, in the initialization process of the storage system, the CPU 21 binds the SQ of the network interface card 22 and the SQ of the solid state disk 24. After the binding, the network interface card 22 may learn of the base address of the SQ of the solid state disk 24. Therefore, the network interface card 22 finds the base address of the SQ of the solid state disk 24 based on an RDMA connection identifier in which the RDMA_WRITE_EXT command is located. Then, the network interface card 22 calculates the destination address of the write command this time in the SQ of the solid state disk 24 based on the base address of the SQ and with reference to the quantity of commands sent to the solid state disk, and writes the write command to the SQ of the solid state disk 24.

As described above, the SQ of the solid state disk 24 may be located in the memory 23, or may be located in the solid state disk 24. When the SQ of the solid state disk 24 is located in the memory 23, the solid state disk queue management module in the network interface card 22 writes the write command to the SQ of the solid state disk 24 in the memory 23. When the SQ of the solid state disk 24 is located in the solid state disk 24, the solid state disk queue management module in the network interface card 22 writes the write command to the solid state disk SQ in the solid state disk 24. In FIG. 5, an example in which the SQ of the solid state disk 24 is located in the memory 23 is used for description.

When the CPU 11 constructs the command in the second optional manner, the network interface card 22 executes the second RDMA_WRITE command, and writes data carried in the second RDMA_WRITE command, namely, the write command, to an address specified in the second RDMA_WRITE command, namely, the destination address of the SQ of the solid state disk 24. The destination address of the SQ of the solid state disk 24 is obtained through calculation by the CPU 11 based on the base address of the SQ of the solid state disk 24 and with reference to the quantity of sent commands.

S505: The network interface card 22 sends the notification to the solid state disk SQ doorbell.

When the CPU 11 constructs the command in the first optional manner, the network interface card 22 may send the notification to the solid state disk SQ doorbell, so that the solid state disk 24 learns that the command is written to the SQ.

As described above, the solid state disk SQ doorbell may be a register in the solid state disk 24. During initial binding of the storage system, the network interface card 22 has learned of the address of the solid state disk SQ doorbell. When sending the notification to the solid state disk SQ doorbell, the network interface card 22 may send a PCIe packet to the address of the solid state disk SQ doorbell. After the solid state disk SQ doorbell receives the packet, the solid state disk may learn that a to-be-executed command is written to the SQ.

When the CPU 11 constructs the command in the second optional manner, the network interface card 22 executes the third RDMA_WRITE command, and writes data carried in the third RDMA_WRITE command, namely, notification information sent to the SQ doorbell of the solid state disk 24, to an address specified in the third RDMA_WRITE command, namely, the address of the SQ doorbell of the solid state disk 24.

S506: The solid state disk 24 reads the write command from the SQ of the solid state disk 24 and parses the write command in the SQ.

S507: The solid state disk 24 obtains the to-be-written data from the storage address in the memory 23, and writes the to-be-written data to the medium of the solid state disk 24.

As described in operation S501, when constructing the write command, the client adds the MR-key and the offset of the solid state disk 24 that correspond to the write buffer to the write command. After parsing the write command in the SQ, the solid state disk 24 may parse out the MR-key and the offset of the solid state disk 24. The solid state disk 24 may learn of the storage address of the to-be-written data in the memory 23 based on the two pieces of information. Then, the solid state disk 24 may obtain the to-be-written data from the storage address in the DMA manner, and write the to-be-written data to the medium of the solid state disk.

It should be noted that, in this embodiment of this disclosure, the solid state disk 24 writing the to-be-written data to the medium of the solid state disk 24 means that the solid state disk 24 is an initiator of the data writing process. Therefore, it is referred to herein that the solid state disk 24 writes the data to the medium of the solid state disk 24. For example, the data is written in the foregoing DMA manner. An essential process of data writing is as follows: The solid state disk 24 requests the DMA controller to write the to-be-written data from the storage address in the memory 23 to the medium of the solid state disk 24. After receiving the request of the solid state disk 24, the DMA controller sends the write command to a memory controller, and the memory controller writes the to-be-written data from the storage address in the memory 23 to the medium of the solid state disk 24.

Specifically, in operation S405, when the CPU 21 registers the write buffer with the solid state disk 24, a driver (which is also a part of a program of the storage device) of the solid state disk 24 queries an operating system based on a virtual address of the write buffer, to obtain a corresponding physical address, generates an address translation table of the write buffer, and notifies the solid state disk 24 of the address translation table. The write buffer is relatively large, but a management granularity of a physical memory is generally relatively small, for example, 4 KB. Therefore, the address translation table includes a plurality of consecutive or inconsecutive physical addresses. The solid state disk 24 receives the MR-key and the offset, searches the address translation table to obtain a physical address at which the to-be-written data is stored, and may initiate a DMA operation based on the physical address.

S508: The solid state disk 24 writes an RDMA_SEND command to the SQ of the network interface card 22.

The RDMA_SEND command carries response information about executing the write command by the solid state disk 24. The response information may be a write success, a write failure, or the like.

As described above, in the initialization process of the storage system, the CPU 21 binds the SQ of the network interface card 22 and the SQ of the solid state disk 24. After the binding, the solid state disk 24 may learn of the base address of the SQ of the network interface card 22. Therefore, the solid state disk 24 may calculate, based on the base address of the SQ of the network interface card 22 and with reference to a quantity of commands written to the SQ of the network interface card, a destination address of the SQ this time, and write the RDMA_SEND command to the SQ of the network interface card 22.

As described above, the SQ of the network interface card 22 may be located in the memory 23, or may be located in the network interface card 22. When the SQ of the network interface card 22 is located in the memory 23, the network interface card queue management module in the solid state disk 24 writes the RDMA_SEND command to the SQ of the network interface card 22 in the memory 23. When the SQ of the network interface card 22 is located in the network interface card 22, the network interface card queue management module in the solid state disk 24 writes the RDMA_SEND command to the SQ of the network interface card 22 in the network interface card 22. In FIG. 5, an example in which the SQ of the network interface card 22 is located in the memory 23 is used for description.

S509: The solid state disk 24 sends a notification to the network interface card SQ doorbell.

After the command is written to the SQ of the network interface card 22, the network interface card 22 cannot actively learn that the command is written. Therefore, the solid state disk 24 may send the notification to the network interface card SQ doorbell, so that the network interface card 22 learns that the command is written to the SQ.

As described above, the network interface card SQ doorbell may be a register in the network interface card 22. During the initial binding of the storage system, the solid state disk 24 has learned of the address of the network interface card SQ doorbell. When sending the notification to the network interface card SQ doorbell, the solid state disk 24 may send a PCIe packet to the network interface card SQ address. After the network interface card SQ doorbell receives the packet, the network interface card 22 may learn that a to-be-executed command is written to the SQ.

S510: The network interface card 22 reads the RDMA_SEND command from the SQ of the network interface card 22.

S511: The network interface card 22 sends the RDMA_SEND command to the network interface card 12.

S512: The network interface card 12 parses the RDMA_SEND command, and reports the response information carried in the command to the CPU 11.

After reporting the response information to the CPU 11, the network interface card 12 sends an ACK command of the RDMA_SEND command to the network interface card 22.

S513: The network interface card 22 writes head pointer information of the SQ of the network interface card 22 to a head pointer address of the SQ of the network interface card 22. A head pointer of the SQ of the network interface card 22 indicates a location of an executed command in the SQ of the network interface card 22. By reading the head pointer, the solid state disk 24 may learn that the SQ of the network interface card 22 is empty or full, to learn whether a command can continue to be written to the SQ of the network interface card 22. In some embodiments, the network interface card 22 may write the head pointer information of the SQ to an address, and the solid state disk 24 obtains the head pointer information of the SQ by reading the address. The address may be an address of a register in the SSD, or may be an address of the memory.

Figure 6:
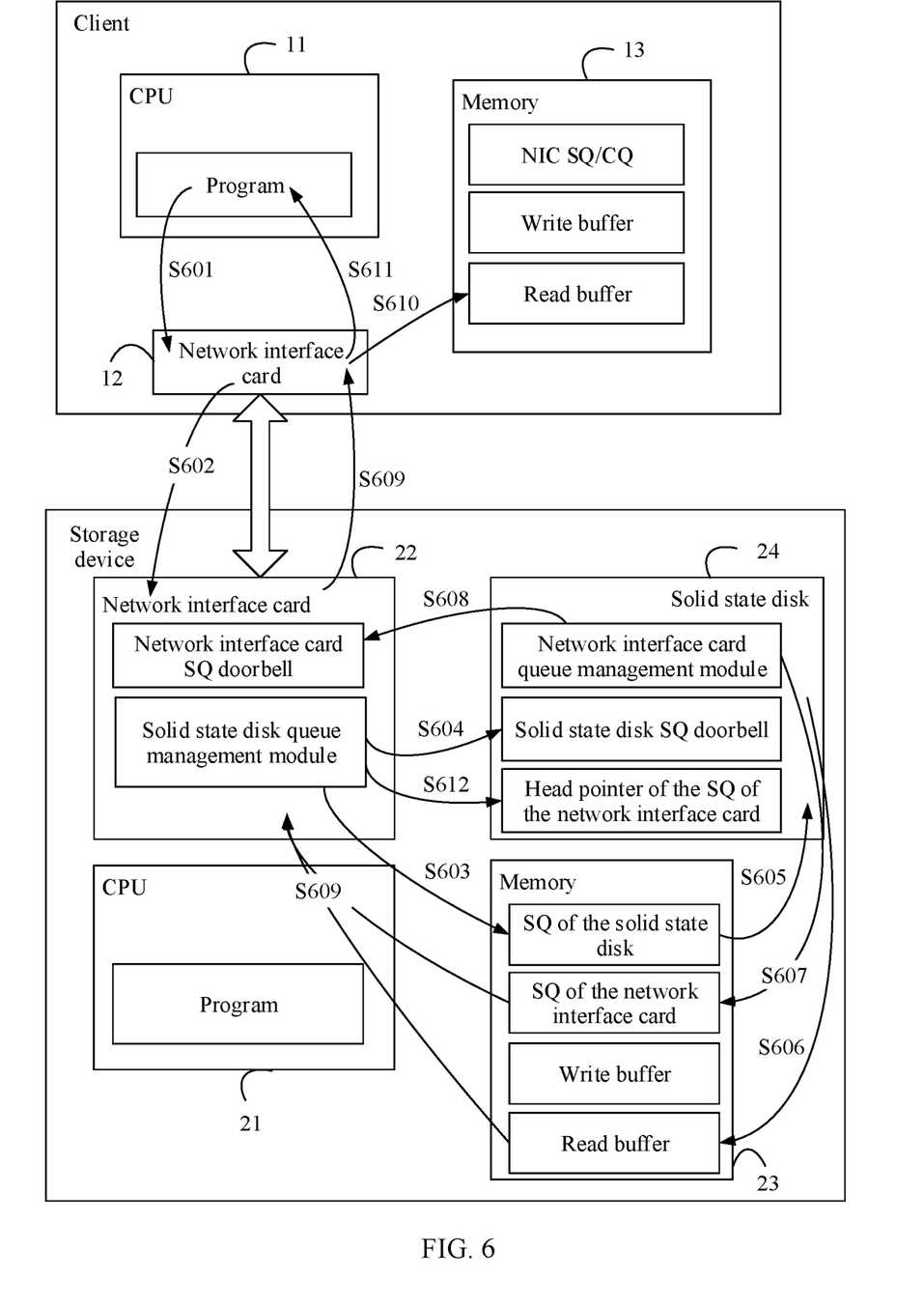
FIG. 6 is a schematic diagram of a data reading process of a method for accessing a solid state disk according to an embodiment of this disclosure.

FIG. 6 is a schematic diagram of a data reading process of the method for accessing the solid state disk according to an embodiment of this disclosure. As shown in FIG. 6, a process in which the client reads data from the solid state disk of the storage device includes the following operations.

S601: The CPU 11 constructs a read command, and sends the read command to the network interface card 12.

As described above, during initialization of a storage system, the CPU 11 allocates a read buffer in the memory 13 of the client. When data in the solid state disk 24 of the storage device is to be read, the CPU 11 may use an address in the read buffer as a destination address in the read command when constructing the read command. After reading the data, the storage device sends the data to the destination address.

In a first optional manner, the CPU 11 may construct an RDMA_WRITE_EXT command, and the RDMA_WRITE_EXT command is the read command.

A method for constructing the RDMA_WRITE_EXT command is the same as the method in operation S501. In addition, in this embodiment, the RDMA_WRITE_EXT command does not carry RDMA data.

In a second optional manner, the CPU 11 may send the read command and a solid state disk SQ doorbell notification by using two RDMA_WRITE commands.

In this manner, the CPU 11 sends a fourth RDMA_WRITE command, where the command includes the read command; and sends the foregoing third RDMA_WRITE command, where the third RDMA_WRITE command includes the solid state disk SQ doorbell notification. In this manner, in operation S405, the CPU 21 may register, with the network interface card, the base address of the SQ and the address of the SQ doorbell of the solid state disk that are obtained in operation S403, and in operation S406, the CPU 21 may send the registration information of the base address of the SQ and the address of the SQ doorbell of the solid state disk to the CPU 11 by using the network interface card 22. Correspondingly, when sending the fourth command, the CPU 11 calculates a destination address of the write command this time in the SQ of the solid state disk with reference to the base address of the SQ of the solid state disk and a quantity of commands sent to the solid state disk, and adds the destination address to the fourth command. When sending the third command, the CPU 11 uses the address of the SQ doorbell as the destination address.

In some embodiments, the read buffer of the memory 23 is managed by the CPU 11, when sending the read command, the CPU 11 may further add a start address of the read buffer in the read command.

S602: The network interface card 12 sends the read command to the network interface card 22.

S603: The network interface card 22 writes the read command to the SQ of the solid state disk 24.

When the CPU 11 constructs the command in the first optional manner, the network interface card 22 parses the RDMA_WRITE_EXT command to obtain the read command.

As described above, in an initialization process of the storage system, the CPU 21 performs an RDMA connection and binds an SQ of the network interface card 22 and the SQ of the solid state disk 24. After the binding, the network interface card 22 may learn of the base address of the SQ of the solid state disk 24. Therefore, the network interface card 22 finds the base address of the SQ of the solid state disk 24 based on an RDMA connection identifier in which the read command is located. Then, the network interface card 22 calculates the destination address of the write command this time in the SQ of the solid state disk 24 based on the base address of the SQ and with reference to the quantity of commands sent to the solid state disk, and writes the read command to the SQ of the solid state disk 24.

When the CPU 11 constructs the command in the second optional manner, the network interface card 22 executes the fourth RDMA_WRITE command, and writes data carried in the fourth RDMA_WRITE command, namely, the read command, to an address specified in the fourth RDMA_WRITE command, namely, the destination address of the SQ of the solid state disk 24. The destination address of the SQ of the solid state disk 24 is obtained through calculation by the CPU 11 based on the base address of the SQ of the solid state disk 24 and with reference to the quantity of sent commands.

As described above, the SQ of the solid state disk 24 may be located in the memory 23, or may be located in the solid state disk 24. When the SQ of the solid state disk 24 is located in the memory 23, the solid state disk queue management module in the network interface card 22 writes the read command to the SQ of the solid state disk 24 in the memory 23. When the SQ of the solid state disk 24 is located in the solid state disk 24, the solid state disk queue management module in the network interface card 22 writes the write command to the solid state disk SQ in the solid state disk 24. In FIG. 6, an example in which the SQ of the solid state disk 24 is located in the memory 23 is used for description.

S604: The network interface card 22 sends the notification to a solid state disk SQ doorbell.

When the CPU 11 constructs the command in the first optional manner, the network interface card 22 may send the notification to the solid state disk SQ doorbell, so that the solid state disk 24 learns that the command is written to the SQ.

As described above, the solid state disk SQ doorbell may be a register in the solid state disk 24. During initial binding of the storage system, the network interface card 22 has learned of the address of the solid state disk SQ doorbell. When sending the notification to the solid state disk SQ doorbell, the network interface card 22 may send a PCIe packet to the address of the solid state disk SQ doorbell. After the solid state disk SQ doorbell receives the packet, the solid state disk 24 may learn that a to-be-executed command is written to the SQ.

When the CPU 11 constructs the command in the second optional manner, the network interface card 22 executes the third RDMA_WRITE command, and writes data carried in the third RDMA_WRITE command, namely, notification information sent to the SQ doorbell of the solid state disk 24, to an address specified in the third RDMA_WRITE command, namely, the address of the SQ doorbell of the solid state disk 24.

S605: The solid state disk 24 reads the read command from the SQ of the solid state disk 24 and parses the read command in the SQ.

S606: The solid state disk 24 executes the read command, and stores the read data at a storage address in the memory 23.

In some embodiments, the storage address in the memory 23 may be an address in the read buffer of the storage device.

In a manner, the read buffer of the memory 23 of the storage device is managed by the CPU 11, when sending the read command, the CPU 11 adds the address in the read buffer. Correspondingly, the solid state disk 24 may store the read data at the storage address in the memory 23 based on the address carried in the read command, and store the read data at the storage address in the read buffer.

Specifically, in operation S405 in the foregoing initialization process of the storage system, when the CPU 21 registers the information about the write buffer and the information about the read buffer with the solid state disk 24, the solid state disk 24 correspondingly generates the memory region key (MR-Key) of the solid state disk 24. There is the unique correspondence between the MR-Key and the read buffer registered with the solid state disk 24. In operation S406, when sending the information about the read buffer to the CPU 11 by using the network interface card 22, the CPU 21 also sends the MR-Key of the solid state disk 24 to the CPU 11. When the storage device sends the read command, the CPU 11 sends the memory region key and an offset address of the solid state disk 24 together with the read command. Then, in this operation, when receiving the read command, the solid state disk 24 may determine, based on the memory region key and the offset address that are sent together with the read command, a start address that is of the read buffer and that is used by the read command. Then, starting from the start address, the solid state disk 24 writes the data read from a medium of the solid state disk 24 to the read buffer.

In another manner, the solid state disk 24 may alternatively manage the read buffer. In operation S405 in the foregoing initialization process of the storage system, after the CPU 21 registers the information about the read buffer with the solid state disk 24, the solid state disk 24 autonomously determines to use an area of the read buffer to store the data read from the solid state disk 24. In some embodiments, the solid state disk 24 may write the read data to the storage address in the memory in a DMA manner. In this manner, the read data may be written to the storage address in the memory by using a DMA controller without participation of a CPU.

S607: The solid state disk 24 writes the RDMA_WRITE command and an RDMA_SEND command to the SQ of the network interface card 22.

The RDMA_WRITE command is used to send the data in the read buffer of the memory 23 to the read buffer of the memory 13.

The RDMA_SEND command carries response information of the read command. The response information may be a read success, a read failure, or the like.

S608: The solid state disk 24 sends a notification to the network interface card SQ doorbell.

The solid state disk 24 sends the notification to the network interface card SQ doorbell, so that the network interface card 22 learns that the command is written to the SQ.

S609: The network interface card 22 sends the RDMA_WRITE command and the RDMA_SEND command to the network interface card 12.

The network interface card 22 executes the RDMA_WRITE command, to send the data in the read buffer of the memory 23 to the network interface card 12. In addition, the network interface card 22 executes the RDMA_SEND command, to send the response information to the network interface card 12.

S610: The network interface card 12 parses the RDMA_WRITE command, and writes the data to the read buffer of the memory 13 of the client in the DMA manner.

S611: The network interface card 12 parses the RDMA_SEND command, and reports the response information carried in the command to the CPU 11.

S612: The network interface card 22 writes head pointer information of the SQ of the network interface card 22 to a head pointer address of the SQ of the network interface card 22.

In embodiments of this disclosure, in a data access process, after receiving the data access command, the network interface card of the storage device may directly interact with the solid state disk to complete data access, without participation of the CPU of the storage device. Therefore, a data access latency can be greatly reduced. In addition, CPU usage of the storage device is greatly reduced.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the process or functions according to embodiments of this disclosure are all or partially generated. The computer may be a general-purpose computer, a dedicated computer, a computer network, or another programmable apparatus. The computer instructions may be stored in a computer-readable storage medium, or transmitted from a computer-readable storage medium to another computer-readable storage medium. For example, the computer instructions may be transmitted from a website, computer, storage node, or data center to another website, computer, storage node, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a storage node or a data center, integrating one or more usable media. The usable medium may be a magnetic medium (for example, a floppy disk, a hard disk, or a magnetic tape), an optical medium (for example, a DVD), a semiconductor medium (for example, SSD)), or the like.

It should be understood that, in embodiments of this disclosure, the term "first" and the like are merely intended to indicate objects, but do not indicate a sequence of corresponding objects.

A person of ordinary skill in the art may be aware that, in combination with the examples described in embodiments disclosed in this specification, units and algorithm operations can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology or some of the technical solutions may be implemented in a form of a software product. The software product is stored in a storage medium, and includes several instructions for instructing a computer device (which may be a personal computer, a storage node, a network device, or the like) to perform all or some of the operations of the methods described in embodiments of this disclosure. The foregoing storage medium includes any medium that can store program code, for example, a USB flash drive, a removable hard disk, a read-only memory (ROM), a random access memory (RAM), a magnetic disk, or an optical disc.

What is claimed is:

1. A method for accessing a solid state disk in a storage device having a network interface card and a central processing unit (CPU), the method comprising:
receiving, in the network interface card, to-be-written data and a write command, wherein the write command instructs to write the to-be-written data to the solid state disk;
writing, by the network interface card based on the write command, the to-be-written data to a memory, the memory being separate from the solid state disk;
writing, by the network interface card, the write command to a submission queue of the solid state disk;
notifying, by the network interface card, the solid state disk that there is a to-be-executed command in the submission queue, wherein the to-be-executed command is the write command to be written by the solid state disk to the submission queue of the network interface card; and
obtaining, by the solid state disk according to the to-be-executed command and without participation of the CPU, the to-be-written data from the memory and writing the to-be-written data to a medium of the solid state disk, wherein a completion of the writing the to-be-written data to the medium of the solid state disk avoids writing, by the network interface card, corresponding completion information to a completion queue.

2. The method according to claim 1, wherein the submission queue of the solid state disk is located in the memory.

3. The method according to claim 1, wherein the submission queue of the solid state disk is located in the solid state disk.

4. The method according to claim 1, wherein the receiving, by the network interface card, the to-be-written data and the write command comprises:
receiving, by the network interface card, a first command, wherein the first command indicates the to-be-written data; and
receiving, by the network interface card, a second command, wherein the second command comprises the write command.

5. The method according to claim 1, wherein the obtaining, by the solid state disk, the to-be-written data from the memory and writing the to-be-written data to the medium of the solid state disk according to the write command comprises:
parsing, by the solid state disk, the write command to obtain a storage address of the to-be-written data in the memory; and
obtaining, by the solid state disk, the to-be-written data from the storage address in the memory, and writing the to-be-written data to the medium of the solid state disk.

6. The method according to claim 1, wherein the notifying, by the network interface card, the solid state disk that there is the to-be-executed command in the submission queue comprises:
sending, by the network interface card, notification information to a submission queue doorbell of the solid state disk, wherein the notification information notifies the solid state disk that there is the to-be-executed command in the submission queue.

7. The method according to claim 6, wherein the sending, by the network interface card, the notification information to the submission queue doorbell of the solid state disk comprises:
sending, by the network interface card, the notification information to the submission queue doorbell of the solid state disk according to a received third command, wherein the third command comprises the notification information.

8. A storage device, comprising:
a central processing unit (CPU),
a network interface card,
a memory, and
a solid state disk separate from the memory, wherein:
the network interface card is configured to receive to-be-written data and a write command, wherein the write command instructs to write the to-be-written data to the solid state disk;
the network interface card is further configured to write, based on the write command, the to-be-written data to the memory;
the network interface card is further configured to write the write command to a submission queue of the solid state disk;
the network interface card is further configured to notify the solid state disk that there is a to-be-executed command in the submission queue, wherein the to-be-executed command is the write command to be written by the solid state disk to the submission queue of the network interface card; and
the solid state disk is configured to obtain, while without participation of the CPU, the to-be-written data from the memory and write the to-be-written data to a medium of the solid state disk according to the to-be-executed command, wherein a completion of writing the to-be-written data to the medium of the solid state disk avoids writing, by the network interface card, corresponding completion information to a completion queue.

9. The storage device according to claim 8, wherein the submission queue of the solid state disk is located in the memory.

10. The storage device according to claim 8, wherein the submission queue of the solid state disk is located in the solid state disk.

11. The storage device according to claim 8, wherein the network interface card is further configured to:
receive an access request, wherein the access request comprises the to-be-written data and the write command.

12. The storage device according to claim 11, wherein the network interface card is further configured to:
parse the access request to obtain the write command, and write the write command to the submission queue of the solid state disk.

13. The storage device according to claim 8, wherein the network interface card is further configured to:
receive a first command, wherein the first command indicates the to-be-written data; and
receive a second command, wherein the second command comprises the write command.

14. The storage device according to claim 8, wherein the solid state disk is further configured to:
parse the write command to obtain a storage address of the to-be-written data in the memory; and
obtain the to-be-written data from the storage address in the memory, and write the to-be-written data to the medium of the solid state disk.

15. The storage device according to claim 8, wherein the network interface card is further configured to:
send notification information to a submission queue doorbell of the solid state disk, wherein the notification information notifies the solid state disk that there is the to-be-executed command in the submission queue.

16. The storage device according to claim 15, wherein the network interface card is further configured to:
send the notification information to the submission queue doorbell of the solid state disk according to a received third command, wherein the third command comprises the notification information.

17. A non-transitory machine-readable medium having instructions stored therein, which when executed by a processor, cause the processor to perform operations, the operations comprising:
receiving, by a network interface card of a storage device, to-be-written data and a write command, wherein the write command instructs to write the to-be-written data to a solid state disk of the storage device, the storage device including a central processing unit (CPU) distinct from the network interface card;
writing, by the network interface card based on the write command, the to-be-written data to a memory of the storage device, the memory being separate from the solid state disk;
writing, by the network interface card, the write command to a submission queue of the solid state disk;
notifying, by the network interface card, the solid state disk that there is a to-be-executed command in the submission queue, wherein the to-be-executed command is the write command to be written by the solid state disk to the submission queue of the network interface card; and
obtaining, by the solid state disk according to the to-be-executed command and without participation of the CPU of the storage device, the to-be-written data from the memory and writing the to-be-written data to a medium of the solid state disk, wherein a completion of the writing the to-be-written data to the medium of the solid state disk avoids writing, by the network interface card, corresponding completion information to a completion queue.

18. The non-transitory machine-readable medium according to claim 17, wherein the submission queue of the solid state disk is located in the memory or in the solid state disk.

19. The non-transitory machine-readable medium according to claim 17, wherein the receiving, by the network interface card, the to-be-written data and the write command comprises:
receiving, by the network interface card, a first command, wherein the first command indicates the to-be-written data; and
receiving, by the network interface card, a second command, wherein the second command comprises the write command.

20. The non-transitory machine-readable medium according to claim 17, wherein the notifying, by the network interface card, the solid state disk that there is the to-be-executed command in the submission queue comprises:
sending, by the network interface card, notification information to a submission queue doorbell of the solid state disk, wherein the notification information notifies the solid state disk that there is the to-be-executed command in the submission queue.

* * * * *